April 14, 1959 H. W. WALDENMAIER ET AL 2,881,795
DIAPHRAGM CHECK-VALVES
Filed Dec. 19, 1956

INVENTORS
HEINZ WERNER WALDENMAIER
WALTER KRAUSE
BY
ATTORNEY.

2,881,795
Patented Apr. 14, 1959

2,881,795

DIAPHRAGM CHECK-VALVES

Heinz Werner Waldenmaier and Walter Krause, Heidenheim (Brenz), Wurttemberg, Germany, assignors to Johannes Erhard H. Waldenmaier Erben Suddeutsche Armaturenfabrik, Heidenheim (Brenz), Wurttemberg, Germany, a corporation of Germany Application December 19, 1956, Serial No. 629,283

Claims priority, application Germany September 1, 1956

3 Claims. (Cl. 137—525.3)

The present invention relates to diaphragm check-valves for pipe lines carrying fluids, but nevertheless also for air-, oil-, lye- and acid-carrying pipe lines.

Check-valves, as is well known, are built as stop valves with a disc or ball serving as shut-off device; these can be omitted in the present application and, therefore, their disadvantages, likewise known, can be eliminated.

It is an object of the present invention to provide a diaphragm check-valve in which any conventional check-valve housing may be used.

It is one object of the present invention to provide a check-valve which, specifically in acid- and lye-carrying pipe lines, does not show the disadvantages of the shut-off devices hitherto used and which functions likewise reliably in water-, air- and oil-carrying pipe lines; simultaneously the manufacturing costs should not be higher than those for the manufacture of check-valves hitherto in use.

It is another object of the present invention to replace the usual shut-off devices, namely a disc and ball, by rubber diaphragms especially designed for this purpose.

It is yet another object of the present invention to provide a return rubber diaphragm which on the one hand is provided with special inserts for raising its strength, but on the other hand is equipped with one or more ridges, the configuration of which is always accommodated to the flowing medium passing through the valve, yet particularly in its lower part is provided with a tongue portion, which is of greater movability than the return rubber diaphragm and which in inoperative position rests on the median bridge portion of the valve-housing and in particular along its entire width.

With these and other objects in view which will become apparent in the following detailed description, the present invention will be clearly understood in connection with the accompanying drawing, in which.

Figure 1:
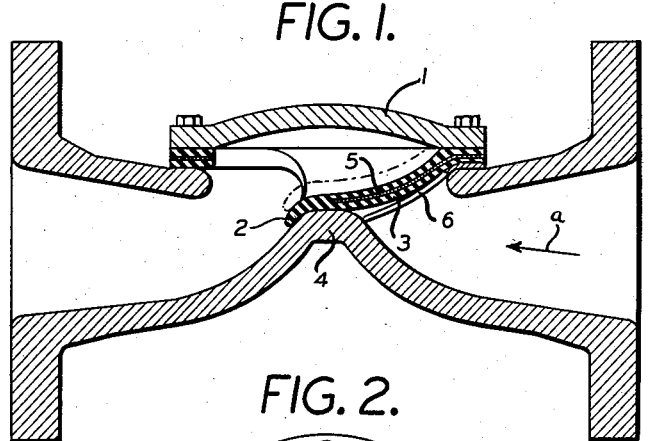
Figure 1 is an axial section through a valve of the present invention.
Figure 2:
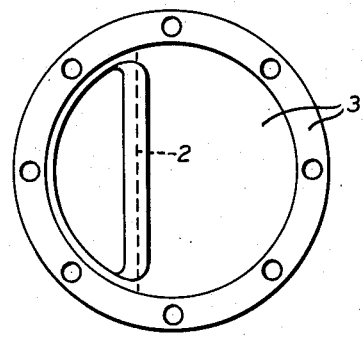
Figs. 2 to 5 show end views of the valve, indicating different embodiments of the return rubber diaphragm.
Figure 3:
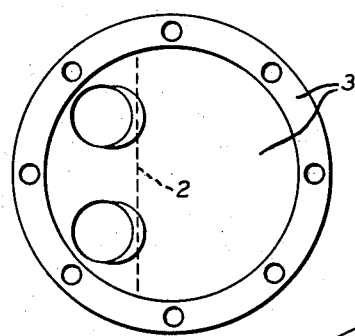
Figure 4:
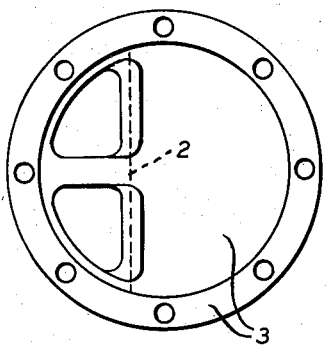
Figure 5:
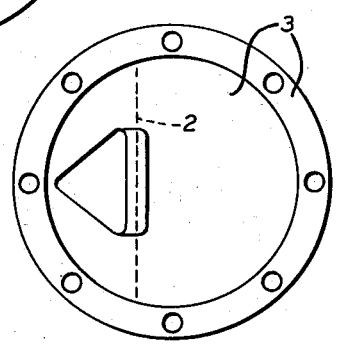

Referring now to the drawing, the valve comprises a housing, which is designed as a conventional industrial diaphragm stop valve housing, on the median bridge portion of which the tongue of the return rubber diaphragm rests in order to prevent the backflow of the fluid in the pipe line; the sealing effect will be so much greater, the higher the pressure prevailing against the predetermined flow direction.

The use of normal conventional housings out of the series of diaphragm stop valves brings about not only considerably lower manufacturing costs, but above all the possibility to change any diaphragm stop valve, without difficulties, to a return valve, merely by inserting a return rubber diaphragm and mounting a cover thereon.

The cover 1 holds the return rubber diaphragm 3 and simultaneously seals the housing and can for inspection purposes be constructed in such a way that it serves as mounting for a glass plate or can be made entirely out of transparent material, so that the diaphragm check-valve can be used as a control device.

When a medium flows in predetermined direction, as shown in Fig. 1 by arrow $a$, the flowing medium will lift the tongue 2 of the return rubber diaphragm 3 from the housing median bridge portion 4, depending upon the amount of flow, to such a degree that the medium has free passage in any event, whereby a special spring-, metal-, linen- and/or plastic-insert 5 disposed in the return rubber diaphragm 3 lifts the latter from its bridge engaging position at any time and yieldingly permits always free flow responsive to the predetermined amount of flow, but still possesses sufficient shape retaining power to stop at any time any backflow by engaging securely and sealing off the bridge portion.

A further advantage of the valve designed in accordance with the present invention resides in the fact that the diaphragm return valve, compared with all other check-valves, is not dependent upon its position and, therefore, functions equally well and safe in any position in the pipe line.

With back flowing media, in particular in the case of diaphragm check-valves of large sizes, the return rubber diaphragm may be subjected to heavy stresses and cause an undesirable deformation. The stability of the return rubber diaphragm 3 may be strengthened in this case by providing one or a plurality of supporting members 6 extending substantially longitudinally from the flange of the housing forming the opening therein to the bridge portion 4.

The possibility of clogging, in particular in the case of pipings through which viscous media are fed, is prevented by providing a connection (not shown) in the cover 1 for flushing the valve.

As stated above, the return rubber diaphragm is equipped with ridges and Figs. 2 to 5 show four different embodiments of diaphragms 3 with ridges of different configuration. These ridges are a security means and are adapted to the specific medium, to the velocity of the passage and to make openings of various predetermined sizes for the passage of the medium.

While we have disclosed several embodiments of the present invention, it is to be understood that these embodiments are given by example only and not in a limiting sense, the scope of the present invention being determined by the objects and the claims.

We claim:

1. A diaphragm check-valve for pipe lines carrying flowing media comprising a housing having entrance and discharge ports connecting a flow passage, a bridge portion forming a weir extending transversely of said flow passage, a substantially plane rubber diaphragm, secured in said housing and having an opening on the side of the return flow in order to feed said return flow to the back-side of said diaphragm, said opening defining a lip portion for engagement with said weir and the latter forming a seat for said diaphragm along its entire width in the closed position of said valve.

2. The diaphragm check-valve, as set forth in claim 1, wherein said housing has an opening opposite said diaphragm and a cover removably secured to said housing to close said opening, and said diaphragm having a flange portion clamped between said housing and said cover, thereby mounting said flange portion only in said housing.

3. The check-valve as set forth in claim 1, which includes at least one supporting member disposed on the pressure side of said diaphragm and extending from said opening with said bridge portion of the housing, in order to support said diaphragm if a back flow pressure occurs.

References Cited in the file of this patent

UNITED STATES PATENTS

| | | |
|---|---|---|
| 314,107 | Chappell | Mar. 17, 1885 |
| 1,800,157 | Saunders | Apr. 7, 1931 |
| 1,855,991 | Saunders | Apr. 26, 1937 |
| 2,191,458 | Duden | Feb. 27, 1940 |
| 2,302,930 | Anderson | Nov. 24, 1942 |
| 2,381,287 | Iler | Aug. 7, 1945 |
| 2,394,911 | Griswold | Feb. 12, 1946 |
| 2,772,829 | Crawford | Dec. 4, 1956 |